United States Patent [19]

Sasagaki et al.

[11] Patent Number: 4,693,577
[45] Date of Patent: Sep. 15, 1987

[54] FOCUSING SCREEN MOUNTING DEVICE IN A CAMERA

[75] Inventors: Nobuaki Sasagaki, Kawasaki; Hidekatsu Fujii, Yokohama, both of Japan

[73] Assignee: Nippon Kogaku K.K., Tokyo, Japan

[21] Appl. No.: 831,633

[22] Filed: Feb. 21, 1986

[30] Foreign Application Priority Data

Feb. 28, 1985 [JP] Japan .............................. 60-28396[U]

[51] Int. Cl.[4] .................. G03B 13/00; G03B 19/12
[52] U.S. Cl. .................................... 354/155; 354/200; 354/219
[58] Field of Search ............... 354/155, 200, 201, 224, 354/225, 219

[56] References Cited

U.S. PATENT DOCUMENTS

| | | | |
|---|---|---|---|
| 4,132,472 | 1/1979 | Urano et al. ......................... | 354/155 |
| 4,187,016 | 2/1980 | Ishizaka .............................. | 354/200 |
| 4,338,010 | 7/1982 | Takahashi ........................... | 354/200 |
| 4,346,973 | 8/1982 | Katsuma et al. .................... | 354/200 |
| 4,365,883 | 12/1982 | Takaoka et al. ................... | 354/200 |

*Primary Examiner*—A. A. Mathews
*Attorney, Agent, or Firm*—Shapiro and Shapiro

[57] ABSTRACT

A focusing screen is inserted from a mirror box side and mounted below a pentaprism. A keeper member formed by bending a linear spring member into the shape of a frame is provided for the positioning of the focusing screen, an engaging pawl for engaging the intermediate portion of the keeper member is provided on a fixed portion near the opening of a lens mount, the opposite end portions of the keeper member opposed to the intermediate portion are rotatably supported on a fixed portion opposite to the lens mount, and the focusing screen is designed to be released from a focusing screen containing chamber along the keeper member when the keeper member is disengaged from the engaging pawl and rotated.

8 Claims, 7 Drawing Figures

FOCUSING SCREEN MOUNTING DEVICE IN A CAMERA

BACKGROUND OF THE INVENTION

1. Field of the Invention

This invention relates to a focusing screen mounting device in a camera, and in particular to a removable focusing screen mounting device in a single lens reflex camera.

2. Related Background Art

The focusing screen of a single lens reflex camera is usually provided below the pentaprism of a finder optical system. Cameras designed to permit the focusing screen to be interchanged with another are known. There are two types of techniques for removing the focusing screen, i.e., the type in which the pentaprism is removed upwardly and then the focusing screen is pulled out upwardly, and the type in which the pentaprism is not moved but the focusing screen is moved downwardly into a mirror box and then is removed. The former type is simple in construction, but all parts are received from above into the camera housing and therefore, where dust or the like has entered the space between the underside of the pentaprism and the focusing screen, it is impossible to clean the pentaprism unless it is removed. Also, where it is desired to interchange the focusing screen with another type of focusing screen, the pentaprism must likewise be removed and thus, the interchange is cumbersome and inconvenient. Further, along with the recent tendency of cameras toward the utilization of electronics, it is often the case that various electronic parts are disposed on the upper surface of the pentaprism, and to remove the pentaprism, it is necessary to remove such electronic parts at the same time, and the removal thereof requires much time.

On the other hand, the latter type is designed as shown, for example, in FIG. 7 of the accompanying drawings. In this Figure, a pentaprism 1 and a field frame 5 are provided in a prism box 3 fixed to a camera housing 4, and a focusing screen 2 is supported in such a manner as to be urged against the lower end surface 13a of the prism box 3 by a holding frame 6 through a plate spring 7. The right end of the holding frame 6 is rotatably supported by a shaft pin 8, and the left end of the holding frame 6 is designed to be engaged by an engaging pawl 9. Accordingly, by pulling the engaging pawl 9 in the direction of the arrow, the holding frame 6 is rotatively displaced downwardly, whereby the focusing screen 2 can be removed.

In this latter type, however, the parts such as the holding frame 6 and the engaging pawl 9 are required, and this leads to an increased cost and also, the space for providing said parts therein has impeded the compactness of the camera.

SUMMARY OF THE INVENTION

It is an object of the present invention to provide a focusing screen mounting device which is very simple in construction and which readily permits removal and interchange of a focusing screen.

In the present invention, the focusing screen is inserted from a mirror box side and mounted below a pentaprism. A keeper member formed by bending a linear spring member into the shape of a frame is provided for the positioning of the focusing screen, an engaging pawl for engaging the intermediate portion of the keeper member is provided on a fixed portion near the opening of a lens mount, the opposite and portions of the keeper member opposed to the intermediate portion are rotatably supported on a fixed portion opposite to the lens mount, and the focusing screen is designed to be released from a focusing screen containing chamber along the keeper member when the keeper member is disengaged from the engaging pawl and rotated.

DESCRIPTION OF THE PREFERRED EMBODIMENTS

Figure 1:
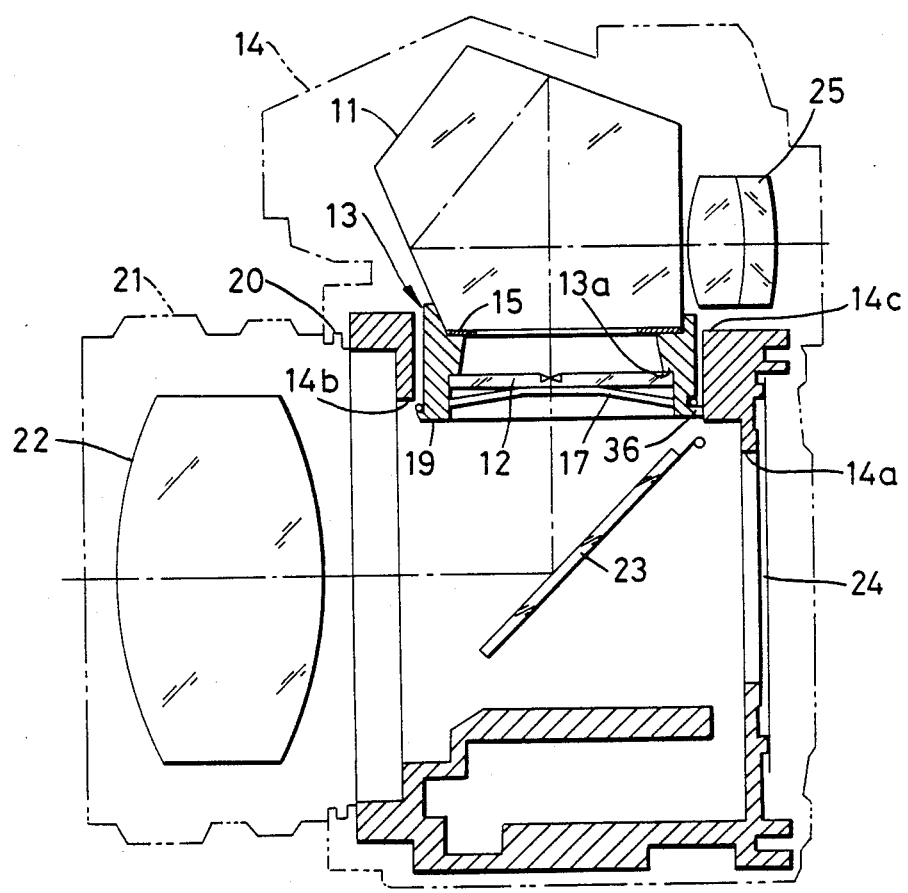
FIG. 1 is a cross-sectional view showing a first embodiment of the present invention.
Figure 2:
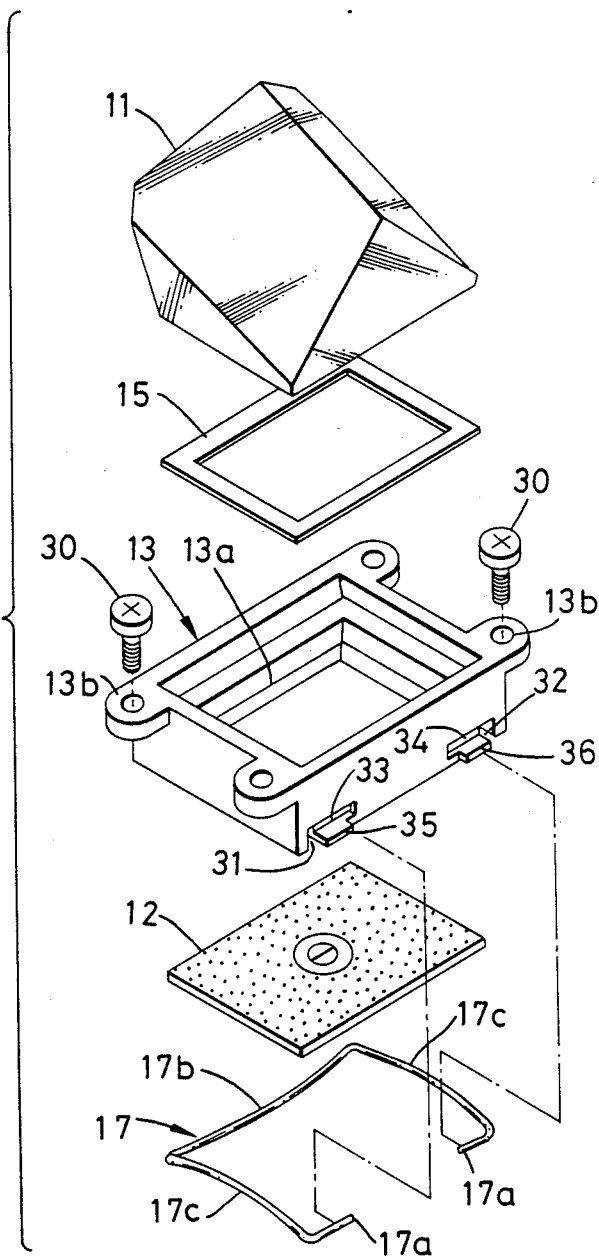
FIG. 2 is an exploded perspective view of the focusing screen mounting portion shown in FIG. 1.

Referring to FIGS. 1 and 2, a pentaroof prism 11 and a field frame 15 are supported in a prism box 13, and a focusing screen 12 is designed to be inserted from below into a focusing screen containing chamber formed in the lower portion of the prism box 13 and be pressed and supported from below by a keeper spring 17 which will later be described in detail. The prism box 13 is mounted on the fixed portion 14c of a camera housing 14 by small screws 30 through outwardly projected mounting seats 13b provided at four locations.

Figure 3:
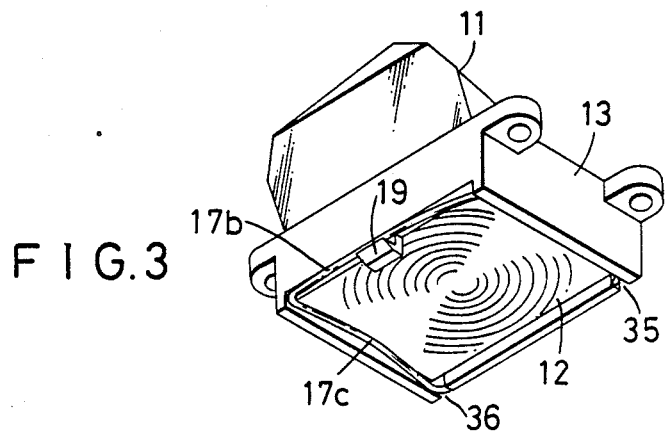
FIG. 3 is a perspective view of the focusing screen mounting portion of FIG. 1 as seen from left and below.

The keeper spring 17 is formed into the shape of a square frame by the use of a corrosion resisting spring material such as a stainless steel wire having its surface subjected to graphitization processing, and the opposite ends 17a thereof are inserted into and supported by cut-away grooves 31 and 32 formed in the outer wall of the prism box 13 which is near an aperture 14a for exposure between a mirror box and a film and support grooves 33 and 34 communicating with the cut-away grooves 31 and 32. The cut-away grooves 31, 32, the support grooves 33, 34 and the opposite ends of the spring 17 together constitute a hinge portion. The middle side 17b of the keeper spring 17 which is opposite to the ends 17a of the keeper spring 17 is somewhat downwardly curved and is designed to be engaged by an engaging pawl 19 (see FIG. 3) projectedly provided on the outer wall of the prism box 13 which is adjacent to a mount 20 for a photo-taking lens barrel 21, and further, the opposite sides 17c of the keeper spring 17 are somewhat upwardly curved and are designed so that the underside of the focusing screen is pressed by the biasing force of the spring when the middle side 17b is engaged by the engaging pawl 19.

The first embodiment of FIG. 1 is constructed as described above and therefore, when the focusing screen 12 is to be removed, the photo-taking lens barrel 21 mounted on the camera housing 14 through a lens mount 20 is first removed from the camera housing 14, whereafter through an opening 14b, the middle side 17b of the keeper spring 17 is disengaged from the engaging pawl 19 against the biasing force of the keeper spring by the use of the tip end of a tool such as a driver.

By this disengagement of the keeper spring 17 from the engaging pawl 19, the keeper spring 17 is permitted to rotate counter-clockwise about the support grooves 33 and 34 as viewed in FIG. 1. In this case, groove walls 35 and 36 below the support grooves protrude outwardly and are in contact with the fixed portion 14c of the camera housing and therefore, the keeper spring 17 does not fall off the groove walls 35 and 36.

In response to the counter-clockwise rotation of the keeper spring 17, the focusing screen 12 separates from a collar portion 13a in the focusing screen containing chamber of the prism box 13 and slides down along the keeper spring 17. Accordingly, by inserting fingers between a movable mirror 23 and the lower end surface of the prism box 13, the focusing screen can be removed easily.

When the focusing screen 12 is to be mounted, the focusing screen 12 may first be inserted into the prism box 13 from therebelow, the keeper spring 17 may be rotated clockwise to push up the focusing screen 12 by the side 17c of the keeper spring, and the focusing screen 12 may be urged against the collar portion 13a, whereafter the middle side 17b of the keeper spring 17 may be brought into engagement with the engaging pawl 19 against the biasing force of the spring.

In this case, the position of the focusing screen 12 is controlled by the collar portion 13a and therefore, the focusing screen 12 is properly installed at a position conjugate with the sensitive surface of the film 24. Accordingly, when the photo-taking lens barrel 21 is mounted, the image of an object to be photographed formed on the focusing screen 12 through an optical system 22 and movable mirror 23 can be observed through the pentaprism 1 and eyepiece 25, whereby focusing can be accomplished accurately.

Figure 4:
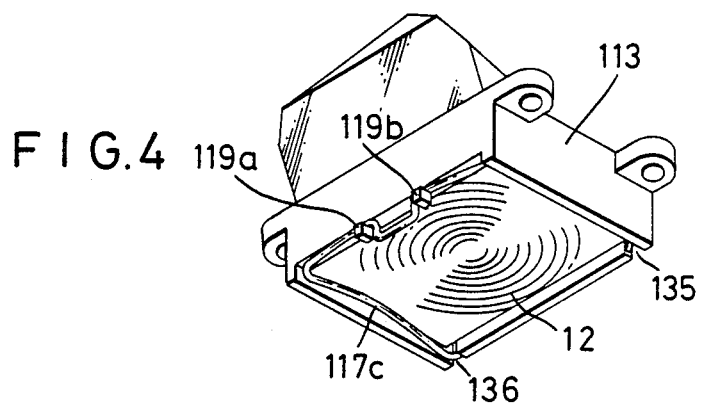
FIG. 4 is a perspective view showing a second embodiment of the present invention.
Figure 5:
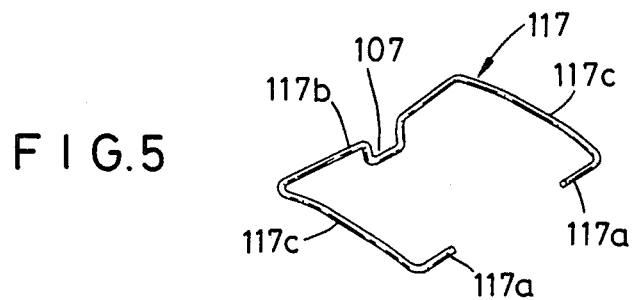
FIG. 5 is a perspective view of the keeper spring of FIG. 4.

FIGS. 4 and 5 shows a second embodiment of the present invention.

A keeper spring 117 has a downwardly crooked portion 107 formed in the central portion of the middle side 117b thereof, and two engaging pawls 119a and 119b projected from the outer wall of the prism box 13 are provided so as to interpose the crooked portion 107 therebetween. The user of the camera can operate the crooked portion 107 by his finger tip, thereby bringing the keeper spring 117 into or out of engagement with the engaging pawls 119a and 119b.

Figure 6:
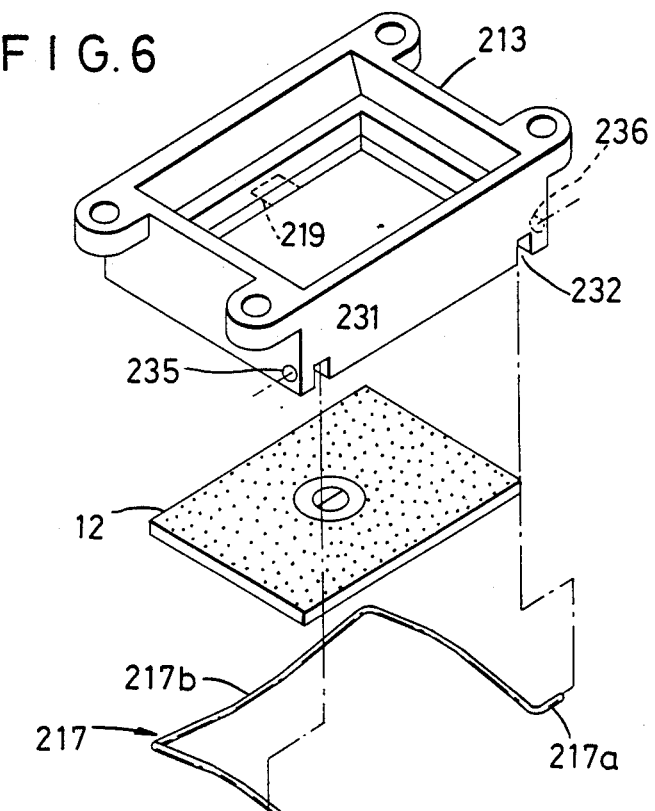
FIG. 6 is an exploded perspective view showing a third embodiment of the present invention.
Figure 7:
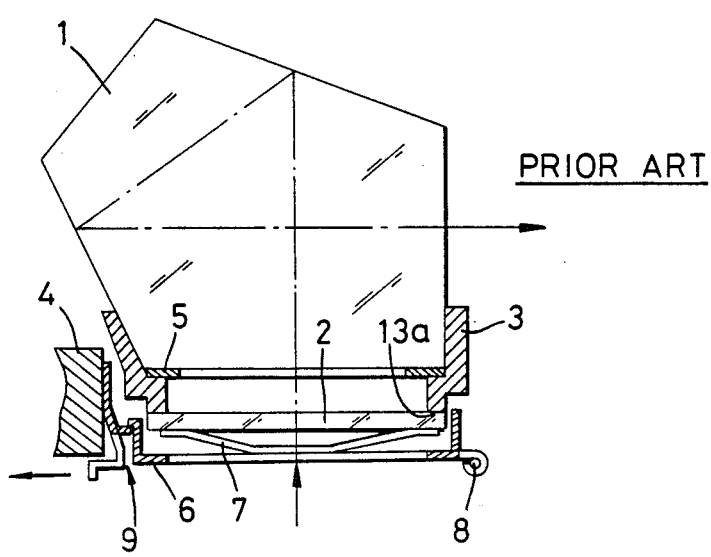
FIG. 7 is a cross-sectional view of a focusing screen mounting device according to the prior art.

FIG. 6 shows a third embodiment of the present invention.

A keeper spring 217 is formed into the shape of a substantially square frame by bending a corrosion resisting spring member, and the opposite ends 217a thereof are bent outwardly. A prism box 213 has formed in the side walls thereof an engaging pawl 219 and cut-away grooves 231, 232 and fitting holes 235, 236 into which the opposite ends 217a of the keeper spring 217 are inserted. The keeper spring 217 is rotatably supported in the fitting holes 235 and 236 and therefore, as compared with the prism box 13 shown in FIG. 2, the prism box 213 in the present embodiment is easy to handle because the opposite ends 217a of the keeper spring are never disengaged from the fitting holes.

Although any of the keeper springs 17, 117 and 217 in the above-described embodiments is formed of a wire material of circular cross-section, they may be formed of a belt-like wire material having flat upper and lower surfaces. Also, the hinge portion for supporting the keeper spring and the engaging pawl for engaging the keeper spring are provided in the side walls of the prism box, but this is not restrictive, but they may also be provided in fixed portions such as the side walls of the mirror box containing the movable mirror 23 therein.

We claim:

1. A single lens reflex camera in which a movable mirror for reflecting a light beam from a photo-taking lens toward a finder optical system having a penta roof prism is provided between the photo-taking lens and a focal plane, said camera comprising:

a housing structure having between said movable mirror and said finder optical system an opening for forming the optical path of the light beam from said photo-taking lens travelling from said movable mirror toward said finder optical system;

a focusing screen member disposed between said movable mirror and said penta roof prism to enable the image of an object to be photographed formed by said photo-taking lens to be observed and having a lower surface adjacent to said movable mirror and an upper surface adjacent to said penta roof prism;

a substantially rectangular frame member provided in said opening of said housing structure for supporting the periphery of said upper surface of said focusing screen member, said rectangular frame member including means for positioning said focusing screen member in said opening; and a resilient single wire member having, near a pair of opposed edges of said focusing screen member, first and second side portions contacting said lower surface of said focusing screen member, a third side portion linking one end of said first side portion and one end of said second side portion, a fourth side portion extending from the other end of said first side portion along a line parallel to said third side portion, and a fifth side portion extending from the other end of said second side portion along said line, said third side portion being releasably coupled to said rectangular frame member and said fourth and fifth side portions being rotatably supported on said rectangular frame member.

2. A single lens reflex camera according to claim 1, wherein said rectangular frame member is releasably secured to said housing structure.

3. A single lens reflex camera according to claim 1, wherein said rectangular frame member supports said penta roof prism together with said focusing screen member.

4. A single lens reflex camera according to claim 1, wherein said positioning means defines the position of said focusing screen member in vertical and horizontal directions with respect to the surface thereof.

5. A single lens reflex camera according to claim 4, wherein said positioning means includes a collar portion provided on an inner surface of said rectangular frame member and contacting said upper surface of said focusing screen member.

6. A single lens reflex camera according to claim 1, wherein said rectangular frame member has pawl means for coupling said third side portion of said resilient wire member to said rectangular frame member.

7. A single lens reflex camera according to claim 1, wherein said first and second side portions of said resilient wire member are curved toward said lower surface of said focusing screen member.

8. A single lens reflex camera according to claim 7, wherein said third side portion of said resilient wire member is curved away from said focusing screen member.

* * * * *